(12) United States Patent
Chu

(10) Patent No.: US 6,926,560 B1
(45) Date of Patent: Aug. 9, 2005

(54) MEMORY CARD CONNECTOR

(75) Inventor: Ching-Chia Chu, Pan Chiao (TW)

(73) Assignee: Molex Incorporated, Lisle, IL (US)

(*) Notice: Subject to any disclaimer, the term of this patent is extended or adjusted under 35 U.S.C. 154(b) by 0 days.

(21) Appl. No.: 10/885,444

(22) Filed: Jul. 6, 2004

(30) Foreign Application Priority Data

Jul. 6, 2004 (TW) .................................. 92212384

(51) Int. Cl.[7] .......................................... H01R 23/70
(52) U.S. Cl. .................................................... 439/630
(58) Field of Search ............................... 439/630, 696, 439/687, 906, 945, 631, 632, 633, 634, 635, 439/636

(56) References Cited

U.S. PATENT DOCUMENTS

| | | | |
|---|---|---|---|
| 6,386,920 B1 * | 5/2002 | Sun ............................. | 439/630 |
| 6,685,512 B2 * | 2/2004 | Ooya .......................... | 439/630 |
| 6,716,066 B1 * | 4/2004 | Kuo ............................ | 439/630 |
| 6,761,320 B1 * | 7/2004 | Chen .......................... | 235/492 |
| 6,796,842 B1 * | 9/2004 | Wang .......................... | 439/630 |
| 6,830,474 B2 * | 12/2004 | Liu et al. ..................... | 439/489 |
| 2003/0100226 A1 * | 5/2003 | Tsai ............................ | 439/630 |
| 2005/0026505 A1 * | 2/2005 | Washino ..................... | 439/630 |

* cited by examiner

Primary Examiner—Ross Gushi
Assistant Examiner—Phuongchi Nguyen
(74) Attorney, Agent, or Firm—Stacey E. Caldwell

(57) ABSTRACT

A memory card connector includes an insulating housing which at least in part defines a card-receiving space. An array of first terminals is mounted on the housing at a rear area of the card-receiving space for engaging appropriate contacts on a first type of memory card. An array of second terminals is mounted on the housing at a forward area of the card-receiving space for engaging appropriate contacts on a second type of memory card. At least one of the second terminals includes a body portion fixed to the housing. A resilient contact arm is cantilevered from the body portion. A contact portion is located at a free end of the resilient contact arm and projects into the card-receiving space. An extension portion extends beyond the contact portion to prevent the contact portion from projecting into any recesses in a surface of a memory card.

7 Claims, 4 Drawing Sheets

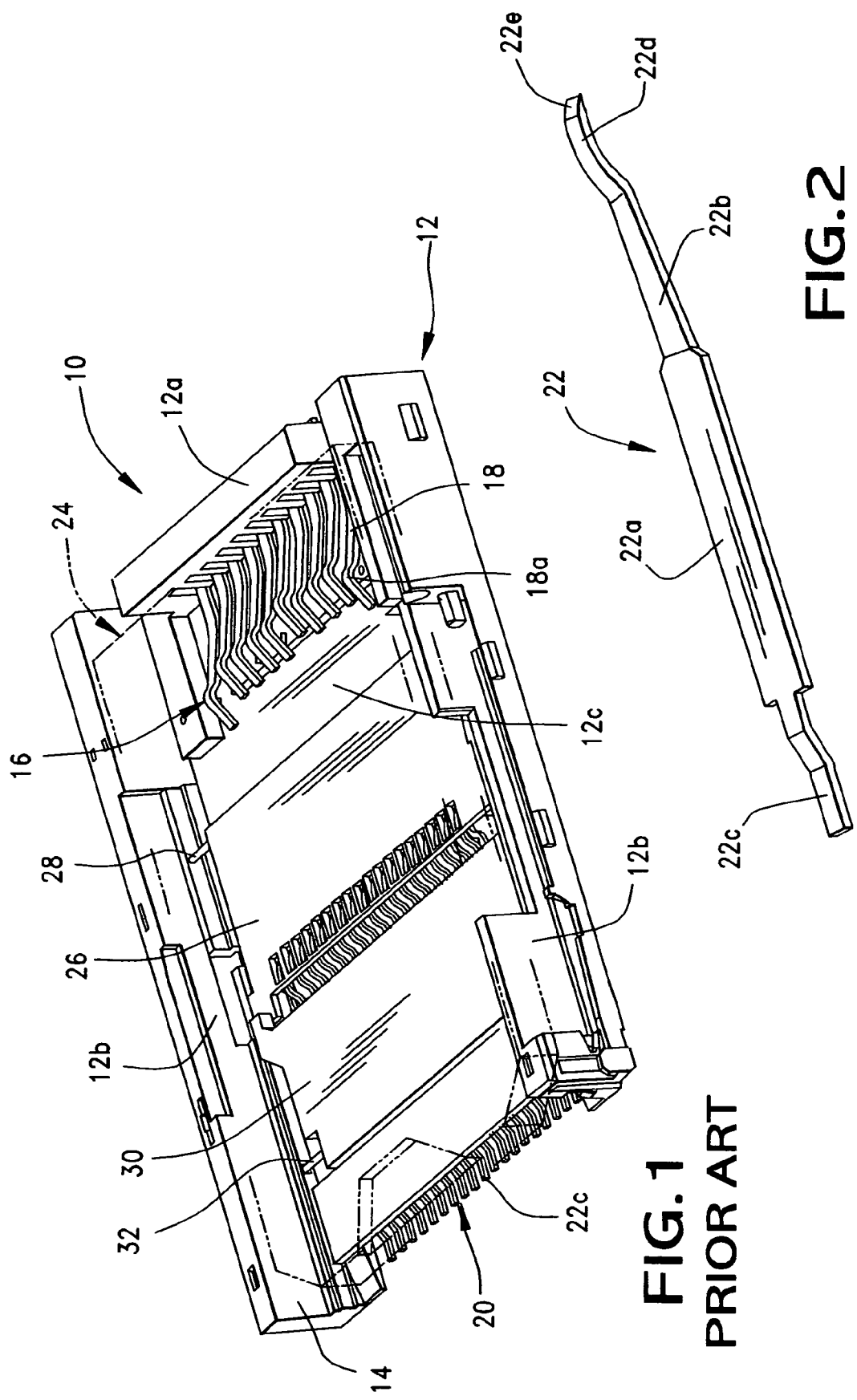

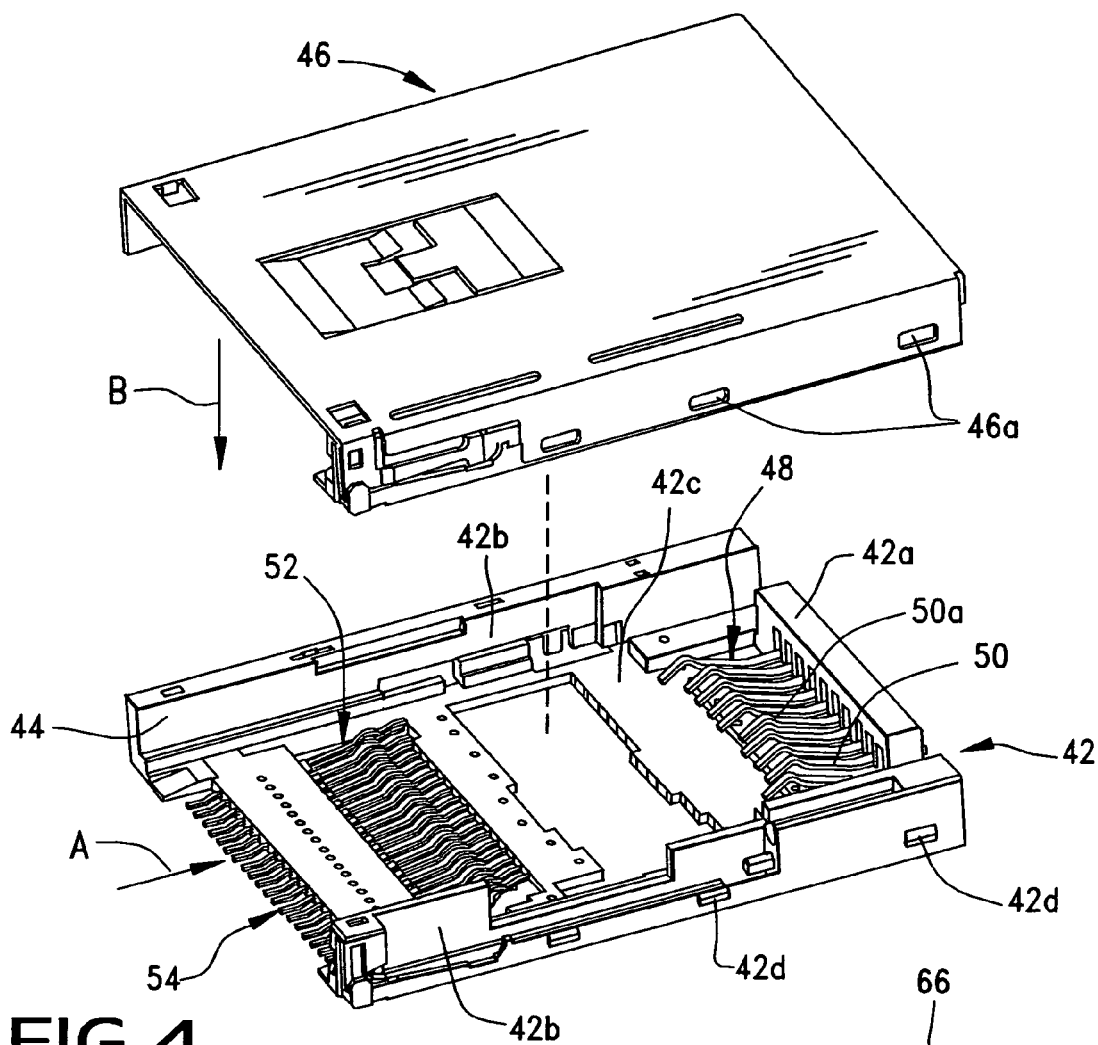
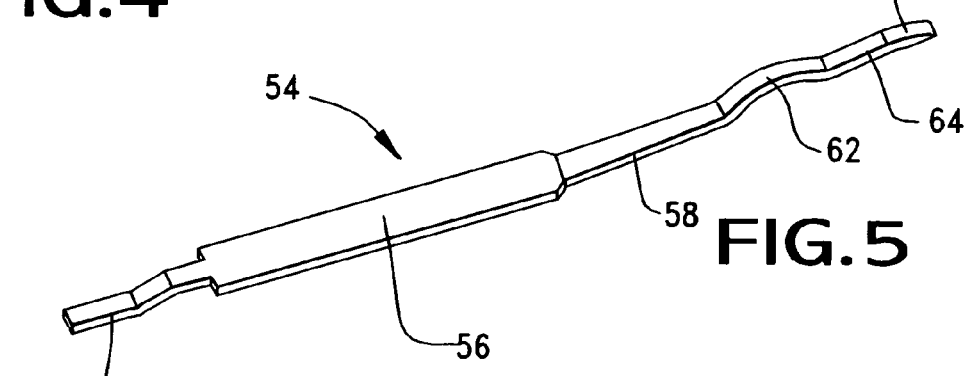
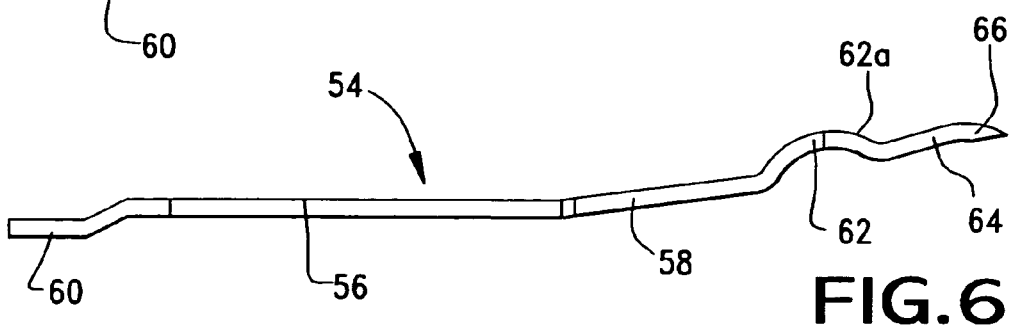

MEMORY CARD CONNECTOR

FIELD OF THE INVENTION

This invention generally relates to the art of electrical connectors and, particularly, to a memory card connector.

BACKGROUND OF THE INVENTION

Memory cards are known in the art and contain intelligence in the form of a memory circuit or other electronic program. Some form of card reader reads the information or memory stored on the card. Such cards are used in many applications in today's electronic society, including video cameras, digital still cameras, smartphones, PDA's, music players, ATMs, cable television decoders, toys, games, PC adapters, multi-media cards and other electronic applications. Typically, a memory card includes a contact or terminal array for connection through a card connector to a card reader system and then to external equipment. The connector readily accommodates insertion and removal of the card to provide quick access to the information and program on the card. The card connector includes terminals for yieldingly engaging the contact array of the memory card.

A typical memory card connector includes some form of dielectric housing which is covered by a metal shell. The metal shell may be stamped and formed of sheet metal material and formed substantially into a box-shape. The metal shell and the housing combine to define a card-receiving cavity. One end of the cavity is open to form a card-insertion opening. The dielectric housing may be generally L-shaped or U-shaped and includes a rear terminal-mounting section at the rear of the cavity, and a longitudinal side wall section extends forwardly from one or both ends of the rear section at one or both sides of the cavity. The contacts or terminals of the connector are mounted on the rear section. The metal shell has a top plate substantially covering the dielectric housing, with side plates extending downwardly over the side wall sections of the housing. The side plates of the metal shell and/or the side wall sections of the housing define the sides of the card-receiving cavity.

The memory card connector often is mounted on the top surface of a printed circuit board, and solder tail portions of the terminals are connected, as by a reflow soldering process, to appropriate circuit traces on the board. The connector may include some form of eject mechanism to facilitate ejecting a memory card from the card-receiving cavity of the housing. The eject mechanism often is mounted on one of the side wall sections of the L-shaped or U-shaped housing.

Most memory card connectors are designed for receiving only one type of memory card. FIG. 1 shows a conventional memory card connector, generally designated 10, that is capable of receiving at least two different kinds of memory cards. Connector 10 includes a dielectric or insulating housing, generally designated 12, which has a rear terminal-mounting section 12a and a pair of side wall sections 12b extending forwardly from opposite ends of the rear section defining a card-receiving space 14 therebetween. The housing includes a base plate 12c which spans side wall sections 12b forwardly of rear terminal-mounting section 12a. An array, generally designated 16, of first terminals 18 are mounted in rear terminal-mounting section 12a of the housing and include contact portions 18a at a rear area of card-receiving space 14. An array, generally designated 20, of second terminals, generally designated 22 (FIG. 2), are mounted on base plate 12c of the housing at a forward area of card-receiving space 14.

FIG. 2 shows one of the second terminals 22 which includes a body portion 22a fixed in the housing, a resilient contact arm 22b extending from one end of the body portion, a solder tail 22c at the opposite end of the body portion, and a contact portion 22d at a free end of resilient contact arm 22b.

Referring to FIGS. 3 and 3A, when a memory card, generally designated 24, such as a MS (Memory Stick) card, is inserted into prior art connector 10, a bottom surface 24a has one or more recesses 24b which ride over contact portions 22d of second terminals 22. In a conventional connector, when memory card 24 is ejected from the rear toward the front of card-receiving space 14, recess(es) 24b have a tendency to stub or even catch on the free distal ends 22e (FIG. 2) of contact portions 22d of the second terminals. This can cause the terminals to become deflected, distorted or damaged. Recesses 24b cannot be eliminated because of the general design specifications of a standard MS memory card.

In order to solve the problem described above, conventional memory card 10 includes a rear pressing plate 26 which is pivoted at 28 between side wall sections 12b of the housing. When the MS memory card 24 is inserted into the connector, it presses down on rear pressing plate 26 which, in turn, presses down on contact portions 22d of all of the second terminals 22 to prevent the free distal ends 22e of the terminals from stubbing into recesses 24b in the bottom surface 24a of the memory card.

Unfortunately, through continued use, along with the reaction forces upwardly from the contact portions of terminals 22, rear pressing plate 26 sometimes becomes warped and blocks the insertion of a MS-type memory card. Consequently, a second, front pressing plate 30 has been added and is pivotally mounted at 32 between side wall sections 12b of the housing. As seen in FIG. 3, a rear portion 30a of front pressing plate 30 pushes down on a front end 26a of rear pressing plate 26 to prevent the front end of the rear pressing plate from blocking insertion of the MS memory card.

The above configuration of front and rear pressing plates 30 and 26, respectively, of the conventional memory card connector shown in FIGS. 1–3A, is expensive, complicated in structure and prone to disengagements. The present invention is directed to providing an improved connector which overcomes these various problems.

SUMMARY OF THE INVENTION

An object, therefore, of the invention is to provide a new and improved memory card connector of the character described.

In the exemplary embodiment of the invention, the memory card connector includes an insulating housing which at least in part defines a card-receiving space. An array of first terminals is mounted on the housing at a rear area of the card-receiving space for engaging appropriate contacts on a first type of memory card. An array of second terminals is mounted on the housing at a forward area of the card-receiving space for engaging appropriate contacts on a second type of memory card. At least one of the second terminals includes a body portion fixed to the housing. A resilient contact arm is cantilevered from the body portion. A contact portion is located at a free end of the resilient contact arm and projects into the card-receiving space. An extension portion extends beyond the contact portion to prevent the contact portion from projecting into any recesses in a surface of a memory card.

As disclosed herein, the resilient contact arm of the second terminal extends at an angle from the body portion toward the card-receiving space. The extension portion extends at an angle to the contact arm toward the card-receiving space. A distal end of the extension portion is beveled in a direction away from the card-receiving space to prevent stubbing in any recesses in the surface of the memory card. The contact portion has a convex contact surface facing the card-receiving space.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 1 is perspective view of a conventional memory card connector according to the prior art and described in the Background, above;

FIG. 2 is a perspective view of one of the second terminals of the prior art connector of FIG. 1;

FIG. 4 is a perspective view of a memory card connector according to the invention, with the cover lifted off of the connector;

FIG. 5 is a top perspective view of one of the second terminals of the connector of FIG. 4, according to the invention;

FIG. 6 is a side elevational view of the terminal of FIG. 5;

DETAILED DESCRIPTION OF THE PREFERRED EMBODIMENT

Figures 3, 3A:
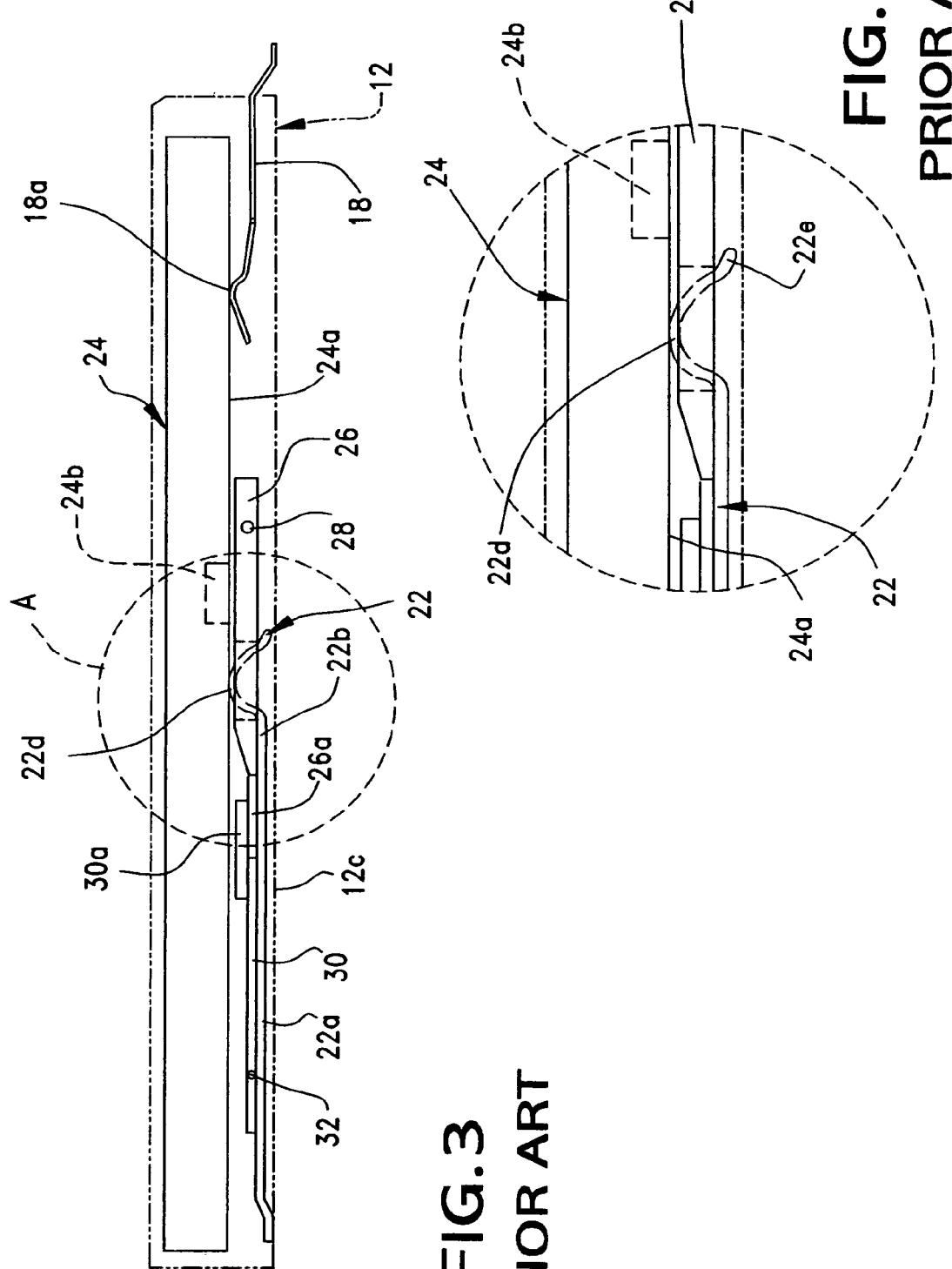
FIG. 3 is a somewhat schematic side elevational view showing an MS-type memory card inserted into the prior art connector.
FIG. 3A is an enlargement of the area circled at "A" in FIG. 3.

Referring to the drawings in greater detail, and first to FIG. 4, the invention is embodied in a memory card connector, generally designated 40, which includes a dielectric or insulating housing, generally designated 42, which defines a memory card-receiving space 44 for receiving different types of memory cards inserted into the connector in the direction of arrow "A". The housing includes a rear terminal-mounting section 42a and a pair of side wall sections 42b extending forwardly from the rear section. A base plate 42c spans the side wall sections forwardly of the rear section. A cover, generally designated 46, is position able over the housing in the direction of arrow "B". The cover may be stamped and formed of sheet metal material, and the housing may be molded of dielectric plastic material. The cover has a plurality of latching apertures 46a for snapping into latching engagement with a plurality of chamfered latching bosses 42d at the outside faces of side wall sections 42b of the housing.

An array, generally designated 48, of first terminals 50 are mounted in rear section 42a of housing 42 and have contact portions 50a projecting forwardly from the rear section into a rear area of card-receiving space 44 for engaging appropriate contacts on an MS-type memory card.

An array, generally designated 52, of second terminals, generally designated 54, are mounted on base plate 42c of the housing at a forward area of card-receiving space 44 for engaging appropriate contacts on either an XD-type memory card or an SD-type memory card.

Referring to FIGS. 5 and 6, each second terminal 54 includes a body portion 56 fixed to the housing. A resilient contact arm 58 is cantilevered from one end of the body portion. A solder tail 60 projects from an opposite end of the body portion for connection, as by soldering, to an appropriate circuit trace on a printed circuit board. A contact portion 62 is located at a free end of resilient contact arm 58. An extension portion 64 extends beyond contact portion 62 to a beveled distal end 66. Second terminals 54 are stamped and formed of conductive sheet metal material. Therefore, it can be seen that body portion 56, resilient contact arm 58, solder tail 60 and extension portion 64 all are generally flat and somewhat elongated. Contact portion 62 is bowed to present a convex contact surface 62a (FIG. 6) facing the card-receiving for engaging an appropriate contact on an XD or an SD memory card. Beveled distal end 66 is sort of bent downwardly away from the card-receiving space.

As seen in FIG. 6, resilient contact arm 58 is angled upwardly (i.e. toward card-receiving space 44) from one end of body portion 56. Extension portion 64 is angled further, i.e., at an angle to resilient contact arm 58, toward the card-receiving space.

Figure 7:
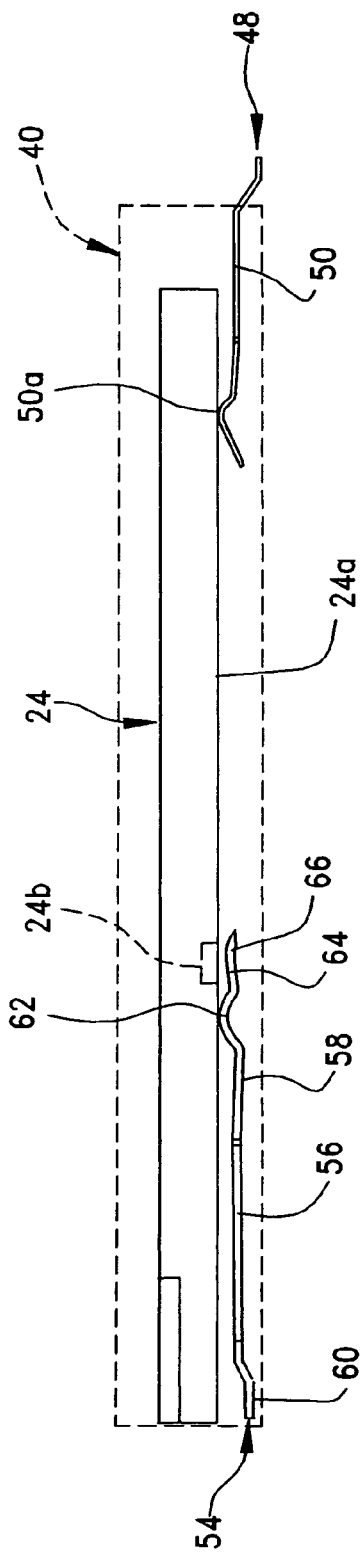
FIG. 7 is a somewhat schematic side elevational view of an MS-type memory card inserted into the connector of FIG. 4.
Figure 8:
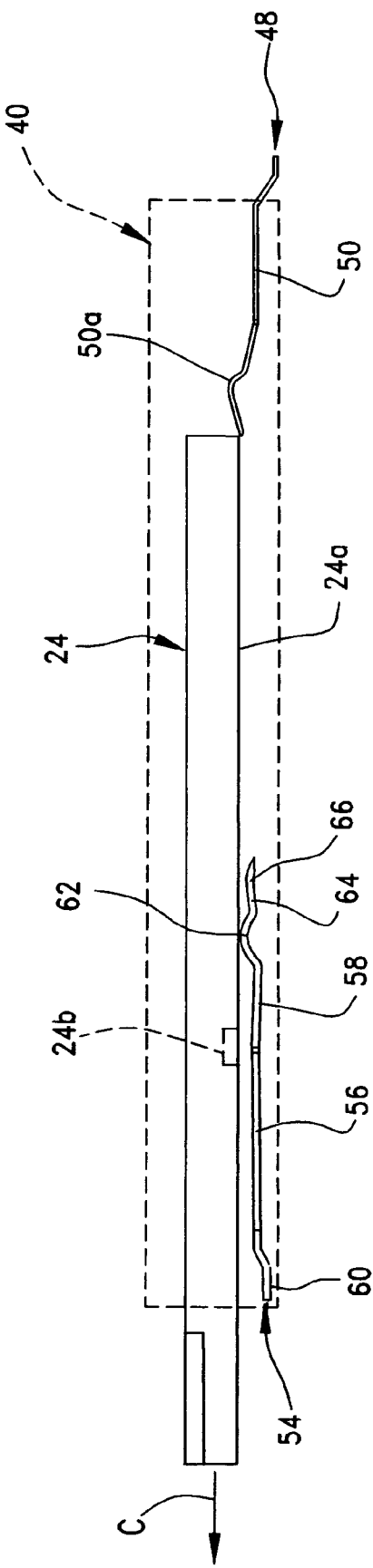
FIG. 8 is a view similar to that of FIG. 7, with the memory card being ejected from the connector.

FIG. 7 shows an MS-type memory card 24 fully inserted into connector 40 until appropriate contacts (not shown) on a bottom surface 24a of the card engages contact portions 50a of first terminals 50. During insertion, the recessed or uneven area(s) 24b in the bottom surface of the memory card ride over contact portions 62 of second terminals 54. However, with extension portions 64 and beveled distal ends 66 of terminals 54 extending beyond the contact portions, the beveled distal ends engage the bottom surface of the memory card and prevent any parts of the contact portions from stubbing into the recesses areas 24b of the memory card. When the memory card is ejected from the connector in the direction of arrow "C" (FIG. 8), recessed areas 24b again simply ride back over the convex surfaces of contact portions 62 of second terminals 54. Beveled distal ends 66 of extension portions 64, being bent downwardly, further ensure that second terminals 70 do not catch or stub on or in any recessed or uneven or irregular surfaces on the bottom of memory card 24.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A memory card connector, comprising:

an insulating housing which at least in part defines a card-receiving space;

an array of first terminals mounted on the housing at a rear area of the card-receiving space for engaging appropriate contacts on a first type of memory card; and an array of second terminals mounted on the housing at a forward area of the card-receiving space for engaging appropriate contacts on a second type of memory card, at least one of the second terminals including a body portion fixed to the housing, a resilient contact arm cantilevered from the body portion, a contact portion at a free end of the resilient contact arm and projecting into the card-receiving space; and an extension portion extending beyond the contact portion to prevent the contact portion from projecting into any recesses in a surface of a memory card.

2. The memory card connector of claim 1 wherein the resilient contact arm of said at least one second terminal extends at an angle from the body portion toward the card-receiving space.

3. The memory card connector of claim 1 wherein the extension portion of said at least one second terminal extends at an angle to the resilient contact arm toward the card-receiving space.

4. The memory card connector of claim 1 wherein a distal end of the extension portion of said at least one second terminal is beveled in a direction away from the card-receiving space.

5. The memory card connector of claim 1 wherein the contact portion of said at least one second terminal has a convex contact surface facing the card-receiving space.

6. A memory card connector, comprising:

an insulating housing which at least in part defines a card-receiving space;

an array of first terminals mounted on the housing at a rear area of the card-receiving space for engaging appropriate contacts on a first type of memory card; and an array of second terminals mounted on the housing at a forward area of the card-receiving space for engaging appropriate contacts on a second type of memory card, a plurality of said second terminals each including a body portion fixed to the housing, a resilient contact arm cantilevered from the body portion at an angle thereto toward the card-receiving space, a contact portion at a free end of the resilient contact arm projecting into the card-receiving space and presenting a convex contact surface facing the memory cards; and an extension portion extending beyond the contact portion at an angle to the resilient contact arm toward the card-receiving space, a distal end of the extension portion being beveled in a direction away from the card-receiving space to prevent the terminal from stubbing on any recessed or uneven areas on the memory card.

7. The memory card connector of claim 6, including a metal shield substantially covering the insulating housing and defining a top of the card-receiving space.

* * * * *